Figure 1:
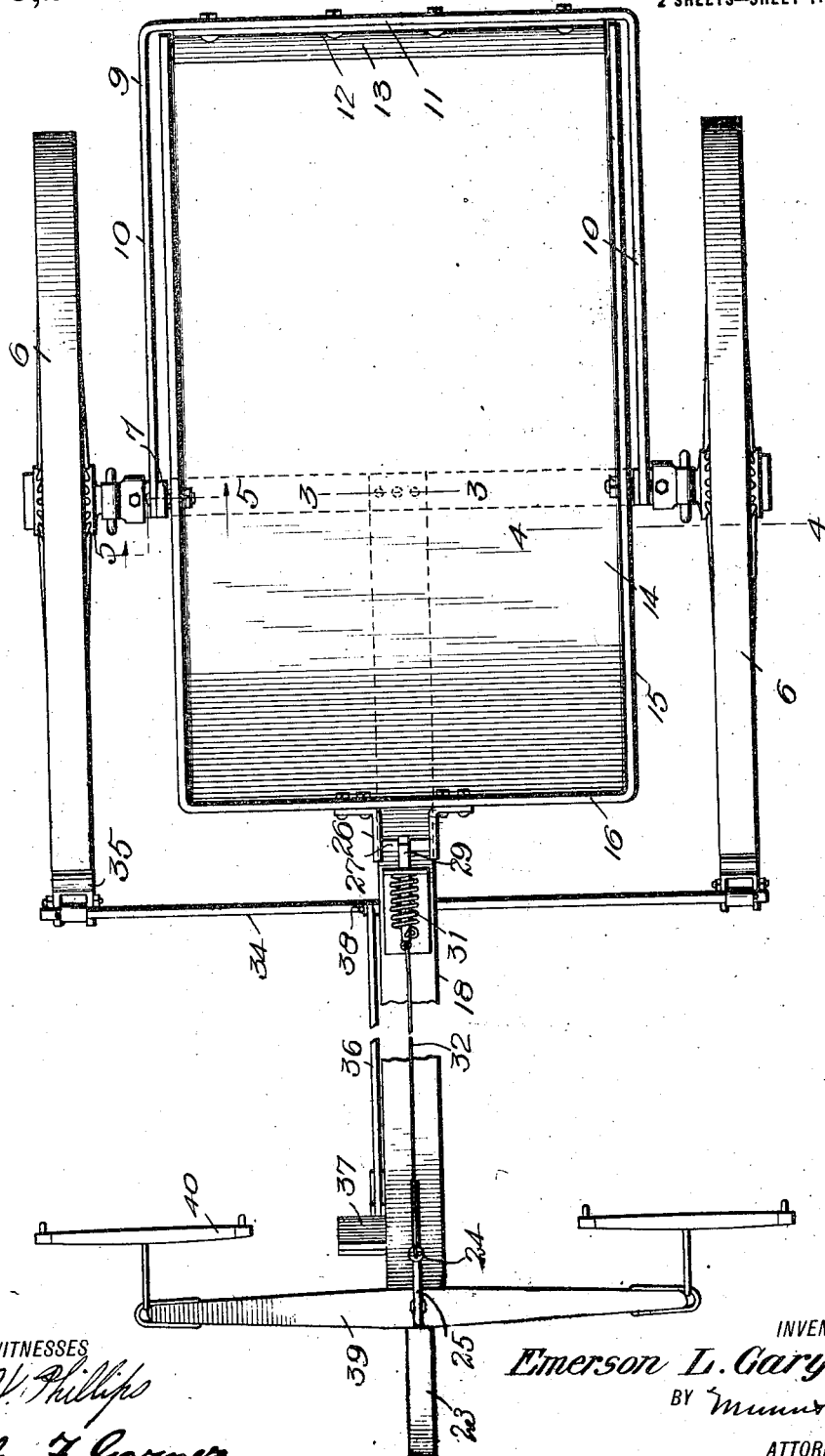

E. L. GARY.
DUMPING MACHINE.
APPLICATION FILED SEPT. 3, 1914.

1,170,240.

Patented Feb. 1, 1916.
2 SHEETS—SHEET 1.

WITNESSES
J. V. Phillips
Alan F. Garner.

INVENTOR
Emerson L. Gary
BY Munn & Co.
ATTORNEYS

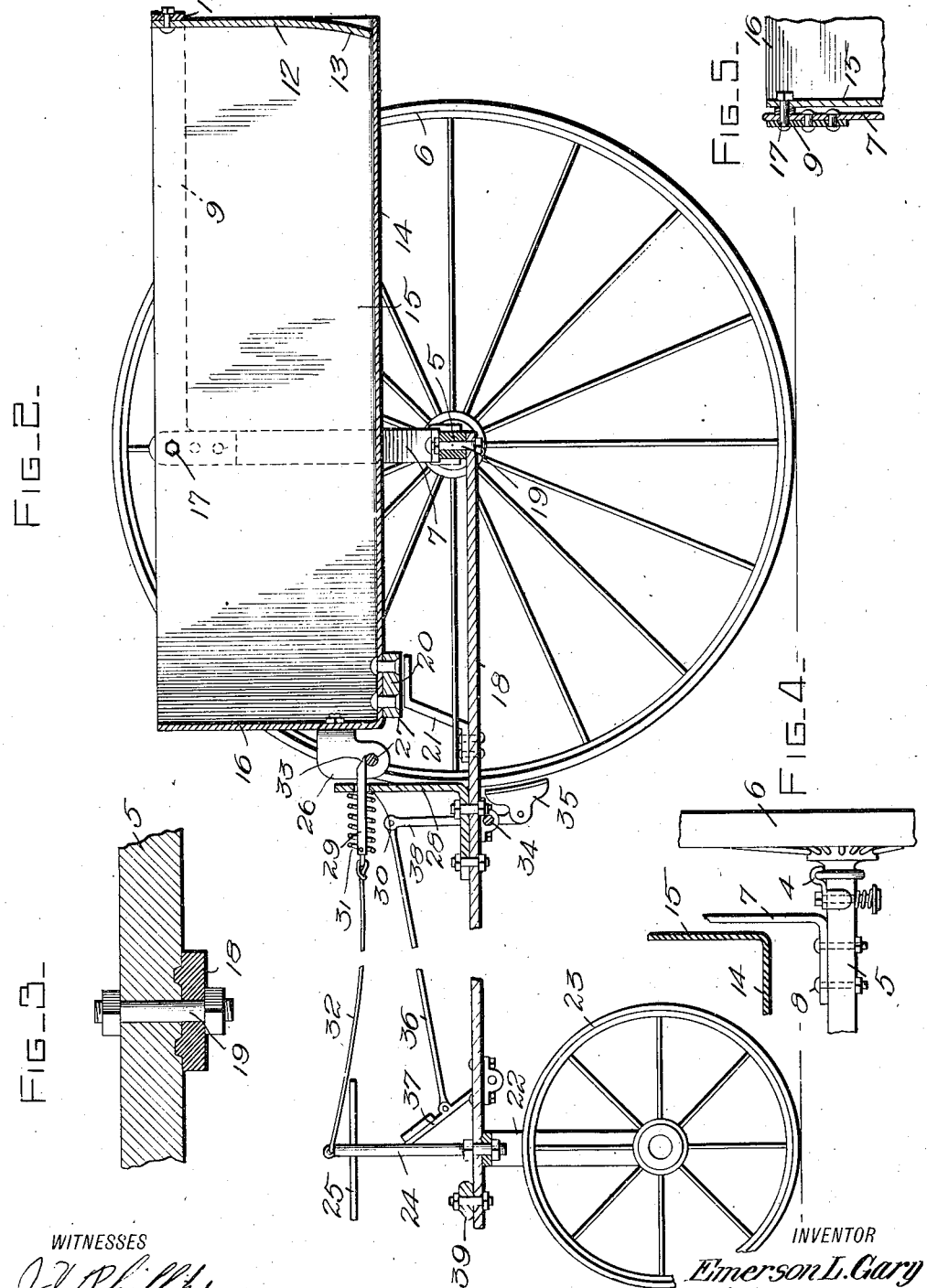

UNITED STATES PATENT OFFICE.

EMERSON L. GARY, OF ANAMOOSE, NORTH DAKOTA.

DUMPING-MACHINE.

1,170,240.      Specification of Letters Patent.      Patented Feb. 1, 1916.

Application filed September 3, 1914. Serial No. 859,984.

*To all whom it may concern:*

Be it known that I, EMERSON L. GARY, a citizen of the United States, residing at Anamoose, in the county of McHenry and State of North Dakota, have invented certain new and useful Improvements in Dumping-Machines, of which the following is a specification.

This invention relates to dumping machines.

The principal object of the invention is to provide a dumping machine adapted to dump its load ahead of the machine and the horses or other mode of propulsion used.
Another object of the invention is to provide a machine adapted to be driven ahead of and to dump its load ahead of the source of propulsion, means being provided whereby the machine can be drawn after the source of propulsion subsequently to dumping of the machine.

A further object of the invention is to provide a dumping machine including a two wheel truck on which the body is carried, and including a reach or draft pole, having a single guide wheel adjacent to its outer end, the pole being provided with a double tree positioned behind the two wheel truck, so that horses hitched to the tree will push the machine in front of them, the double tree being reversible so that after the machine has been dumped the horses may be turned so as to draw the machine behind them when leaving the dumping pile.
Still another object of the invention is to provide a device of the class described which will be extremely simple, durable, efficient in operation and inexpensive to manufacture.
With these and other objects in view which will become apparent as the description proceeds, the invention resides in the construction, combination and arrangement of parts, hereinafter more fully described and claimed, and illustrated in the accompanying drawing, in which like characters of reference indicate like parts throughout the several figures, of which—

Figure 1 represents a top plan view of a machine constructed according to my invention. Fig. 2 represents a central vertically longitudinal sectional view through the same. Fig. 3 represents a detail sectional view taken transversely on the plane indicated by the line 3—3 of Fig. 1. Fig. 4 represents a fragmentary sectional view taken on the plane indicated by the line 4—4 of Fig. 1, and Fig. 5 represents a fragmentary transverse sectional view taken on the plane indicated by the line 5—5 of Fig. 1.

The two wheel truck includes an axle 5, on which the ground wheels 6 are journaled. From near the ends of the axle vertical uprights 7 extend, said uprights being secured to the axle by suitable fastening means 8. Spring actuated scrapers 4 are carried by the axle adjacent the hubs of the wheel, for preventing collection of dirt upon the latter. Secured to the uprights at their higher ends, and in a horizontal position is a yoke 9. This yoke extends forwardly of the machine and includes side bars 10 connected by a cross bar 11. To the latter is secured an end gate 12 which at its lower end is curved toward the axle as at 13.

The body is disposed between the uprights, and includes a bottom 14, sides 15 and a back 16 disposed at one end. The opposite and front end of the body is open, and the body is so positioned that the stationary end gate 12 controls this open end. The body is pivotally secured rearwardly of its transverse medial line, to the uprights 7. Pins 17 carried at the upper ends of the uprights extend through the side walls 15 of the body near the upper edges thereof and serve as pivot points upon which the body is hung.

A reach or draw bar 18 extends rearwardly from the two wheel truck, and is secured at its forward end to the central portion of axle 5 by means of a bolt or suitable fastening 19. A weight 20 is secured to the body near the rear closed end thereof, and serves to maintain the same in horizontal position when the body is empty and a stop or bumper 21 is supported by reach 18 and is adapted to be engaged by the weight for limiting the movement of the body in one direction.

Pivotally connected to the rear end of reach 18, and depending from the same is a yoke 22. A smaller single guide wheel 23 is journaled in the yoke beneath the reach. A shaft 24 secured centrally of the yoke extends upwardly through the reach and is provided with a cross bar 25. The cross bar serves as means whereby the shaft may be turned, for turning the yoke and thus disposing the guide wheel at various angles relative to the ground wheels for guiding the machine.

When the body is filled with earth or other material, the weight will be so much greater on the outer end, or that end adjacent the end gate 12, as to tend to swing the open end of the gate downwardly for dumping the same. In order to maintain the body in horizontal position against this tension, a trip means is provided which includes a pair of ears or lugs 26 secured to rear wall 16 centrally thereof and in spaced relation to each other, said ears supporting a transversely disposed pin 27.

A standard 28 secured on the reach rearwardly of the body serves as a support and guide for a detent or pin 29, which extends at one end through an opening 30, in the standard and at its opposite end is connected to a spring 31. This spring is supported by the standard and surrounds detent 29, and normally maintains the latter in such position that one end of the detent is disposed above the transverse pin 27 whereby to maintain the body in horizontal position when loaded. A cord 32 connected to the detent 29 serves as means by which the latter may be withdrawn against tension of spring 31, from engagement with pin 27 whereby to allow the body to swing forwardly and downwardly upon its pivot 17, so that the contents of the body will slide therefrom onto the ground. The detent at its inner end is beveled at 33 so that when the body is empty and is automatically returned to position by action of weight 20, the transverse pin 27 may be automatically engaged by the detent.

A rock shaft 34 is journaled in a bracket beneath the reach and extends transversely thereof and to the ends of the shaft are connected the brake shoes 35. A link 36 connects a foot operable lever 37 adjacent the steering post 24 with a crank arm 38 carried by the rock shaft, so that upon operation of the lever the brakes may be set or released as desired.

Secured upon the rear end of reach 18 is a cross beam 39 which extends transversely of the reach, and at its ends carries swingletrees 40. Draft animals are adapted to be hitched to the swingle-trees and are positioned between them and the body of the dumping machine so that when the body is full the machine travels ahead of the draft animals to the dumping ground. The driver or operator stands upon the reach between the draft animals in position to operate the guide wheel 23 and the trip mechanism. Upon reaching the place at which the contents of the machine is to be deposited the trip mechanism is released thus dumping the contents in front of the draft animals. The draft animals may then be turned around, one turning to the right and one turning to the left until they are again side by side but facing away from the body of the machine. Thus on the way from the dumping ground the machine will be drawn behind the animals.

Such a machine as I have described will be particularly useful in building roads, for the reason that the contents of the machine may be dumped in front of the draft animals, so that they may always remain on the completed portion of the road, rather than to have to leave the completed for the uncompleted and often times muddy and murky portion before drawing the machine into the desired position for dumping. It will also be useful in places where it is impossible to work horses without first providing a road for them to work on.

Although I have described the preferred embodiment of my invention, I may desire to make such changes in the construction, combination and arrangement of parts thereof as do not depart from the spirit of the invention and the scope of the appended claim.

I claim:—

A dumping machine comprising a truck, a dumping body carried by the truck and having a floor fixed with relation to the body, a reach connected with the truck and having a reversible draft mechanism pivotally mounted thereon, said draft mechanism being fixed with respect to movements toward and away from the body, and means whereby the body may be dumped irrespective of whether the machine as a whole is moving or is at a standstill.

EMERSON L. GARY.

Witnesses:
W. J. HEINZELMANN,
THERON STOHR.